United States Patent [19]

Wheless

[11] Patent Number: 4,878,883
[45] Date of Patent: Nov. 7, 1989

[54] CONTINUOUSLY VARIABLE CHAIN DRIVE TRANSMISSION

[76] Inventor: Thomas K. Wheless, 1570 W. Maggio Way, Bldg. 24, Apt. 2055, Chandler, Ariz. 85224

[21] Appl. No.: 281,527

[22] Filed: Dec. 8, 1988

[51] Int. Cl.⁴ ............................................. F16H 55/54
[52] U.S. Cl. ..................................................... 474/51
[58] Field of Search ..................................... 474/47–57

[56] References Cited

U.S. PATENT DOCUMENTS

| | | | |
|---|---|---|---|
| 724,449 | 4/1903 | Dumaresq | 474/56 X |
| 2,700,902 | 2/1955 | Sampiero | 474/51 |
| 3,087,349 | 4/1963 | Herting | 474/51 |
| 3,613,468 | 10/1971 | Rand | 474/53 X |
| 4,295,836 | 10/1981 | Kumm | 474/51 |
| 4,498,351 | 2/1985 | Ahoor | 474/53 X |

Primary Examiner—Thuy M. Bui
Attorney, Agent, or Firm—Richard C. Litman

[57] ABSTRACT

A sprocket wheel and control mechanism for a chain or belt drive transmission with a continuously adjustable mechanical advantage has diametrically opposed sprocket, spur and/or friction gears offset from the center of the sprocket wheel. Piston and cylinder assemblies are used to position the sprocket, spur and/or friction gears. There is a mechanism for equalizing the distance from the axis of the sprocket wheel of the sprocket, spur and/or friction gears, the equalizing mechanism using a collection of linear linkage guides such as telescoping sleeves and rods, or a series of intermeshed gears connecting toothed shafts in the manner of a rack and pinion. A valve regulates the hydraulic fluid to the piston and cylinder assemblies on the sprocket wheel.

4 Claims, 2 Drawing Sheets

CONTINUOUSLY VARIABLE CHAIN DRIVE TRANSMISSION

FIELD OF THE INVENTION

This invention relates generally to a sprocket wheel of a chain or belt drive with a continuously variable mechanical advantage mechanism, and more specifically to a hydraulically controlled piston/cylinder arrangement varying the positions of sprocket, spur and/or friction gears situated on the sprocket wheel. The sprocket, spur and/or friction gears represent the linkage on the sprocket wheel that meshes with the chain or belt of the chain or belt drive. In the case of a chain drive, the chain meshes with sprocket gears. With a belt drive, the belt may be toothed and mesh with spur gears, or a friction belt engaging with friction gears. There is other linkage that tends to make the displacement of the sprocket, spur and/or friction gears from the center of the sprocket wheel equidistant for each of the sprocket, spur and/or friction gears.

BACKGROUND OF THE INVENTION

U.S. Pat. No. 4,498,351 to R. Ahoor is drawn to a hydraulically and continuously regulated mechanical advantage chain drive mechanism. Equally displaced sectors for receiving the chain are provided using equally pressured cylinders and pistons to achieve equal displacement of the sectors.

U.S. Pat. No. 3,087,349 to G. B. Herting is drawn to a hydraulically adjustable peripheral portion of a pulley wheel to gain continuous adjustment with the need of using different-sized pulleys.

U.S. Pat. No. 3,613,468 to S. Rand is drawn to a continuously variable transmission system employing a segmented pulley mounted on parallel conic axial members hydraulically controlled.

U.S. Pat. No. 724,449 to W. N. Dumaresq is drawn to a mechanically adjustable continuously variable chain transmission using spur gears.

U.S. Pat. No. 3,850,044 to D. H. Hagen is drawn to a mechanically adjustable continuously variable chain transmission using spur gears for a bicycle.

U.S. Pat. No. 3,969,948 to C. D. Pipenhagen, Jr. is drawn to a continuously variable bicycle automatic transmission that the mechanical advantage is regulated by external resistance to pedaling of a bicycle using spur gears.

U.S. Pat. No. 3,995,508 to H. R. Newell is drawn to a continuously variable bicycle automatic transmission that the mechanical advantage is regulated mechanically using spur gears with a dampener to reduce cyclic fluctuations in the drive ratio.

None of the above noted patents are seen to disclose the specific arrangement of concepts disclosed by the present invention.

SUMMARY OF THE INVENTION

It is an object of the present invention to provide apparatus to allow continuous adjustment of mechanical advantage of a chain or belt drive.

It is another object of the present invention to provide apparatus to insure uniform location of sprocket, spur and/or friction gears on the sprocket wheel to mesh with a chain or belt.

It is a further object of the present invention to provide a hydraulic system for locating the sprocket, spur and/or friction gears on the sprocket wheel.

It is an additional object of the present invention to provide a valve and pump for regulating the flow of hydraulic fluid to piston and cylinder assemblies to control the effective diameter of the sprocket wheel by adjusting the position of the sprocket, spur and/or friction gears on the sprocket wheel.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters designate corresponding parts throughout the several figures of the drawings.

DESCRIPTION OF THE PREFERRED EMBODIMENT

Figure 1:
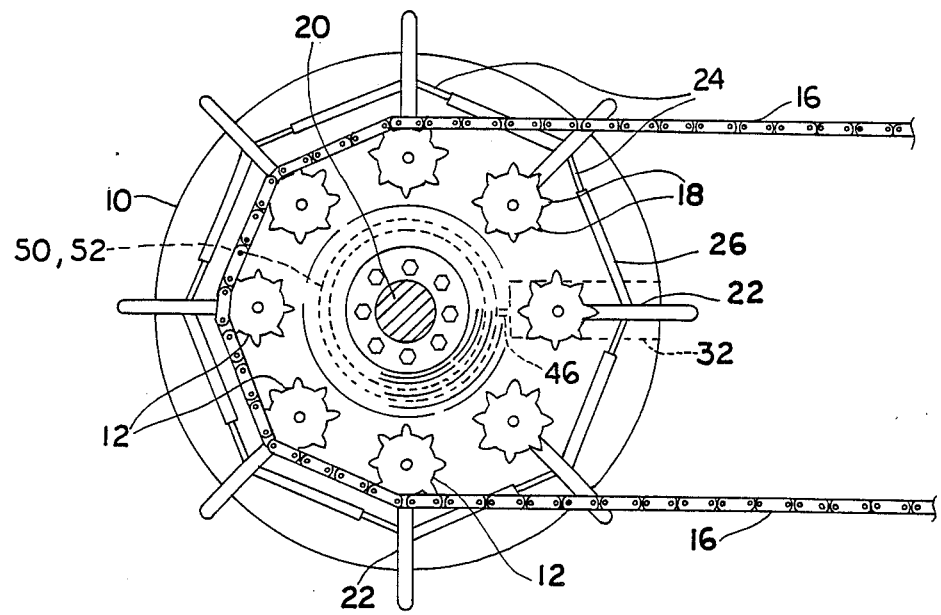
FIG. 1 is an elevational view of the sprocket wheel showing the disposition of the sprocket, spur and/or friction gears for engagement with the chain or belt.

The present invention is seen to consist of a stationary hub 38 containing various components, generally labeled S in the drawings, and a sprocket wheel 10 and associated mechanisms generally labeled R which rotate around stationary hub S.

Figure 3:
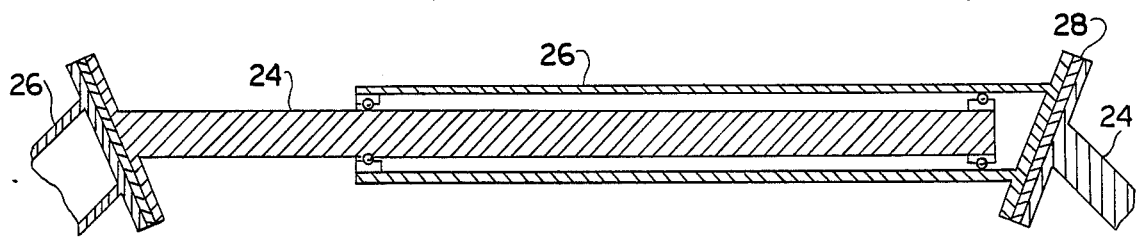
FIG. 3 is a sectional view of one portion of an equalizing mechanism to insure that all the sprocket, spur and/or friction gears tend to be at the same distance from the axis of the sprocket wheel.
Figure 4:
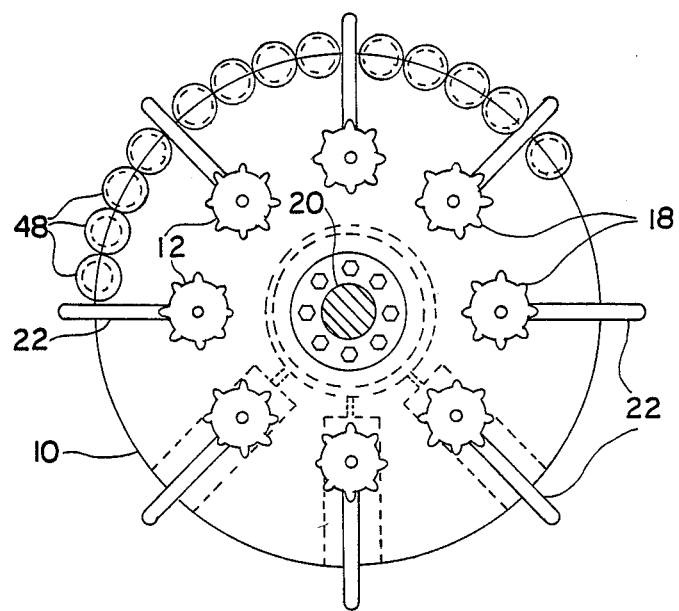
FIG. 4 is an elevational view of an alternative equalizing mechanism for the above purpose.

FIG. 1 is an elevational view of the sprocket wheel 10 showing the basic mechanism of how a sprocket wheel 10 of variable range of effective diameters is mechanically achievable. A plurality of diametrically opposed sprocket, spur and/or friction gears 12 movably mounted on portions 22 of FIGS. 1 and 2 of piston and rod assemblies 14 (shown in FIG. 2) that move radially in toward and away from the center of the sprocket wheel 10. Obviously the number and size of piston and rod assemblies 14, and the diameter and tooth spacing of gears 12 as applicable, may be modified depending upon the size, torque, and/or other requirements of any given application of the device. In FIG. 1 a chain or belt 16 is driven by or drives the sprocket wheel 10 by meshing engagement of the chain or belt with the teeth or friction pads 18 of the sprocket, spur and/or friction gears 12 which are each constrained by one way clutches, not shown, in their centers to rotate in one direction. Centrally of the sprocket wheel 10 is a shaft 20 upon which the sprocket wheel 10 is mounted for rotary motion. The portions 22 of the assemblies that move radially tend to form uniform effective diameters and tend to be equidistant of the center of the sprocket wheel 10 and mechanically are kept that way by a regularly disposed collection of linear linkage guides, such as telescoping rods 24 and sleeves 26 shown in FIG. 1 and a single association of rod and sleeve in greater detail in FIG. 3. An alternative method is shown in FIG. 4, in which a series of intermeshed sprocket or spur gears 48 are arranged circumferentially around sprocket wheel 10 near the circumference, so as to intermesh with one another and also simultaneously mesh with arm 22, which has been suitably modified for operation in this embodiment with a series of teeth along each side as in the commonly known rack and pinion arrangement. These equalizing assemblies may be attached anywhere on the piston and rod assemblies and may incorporate additional structure for attachment. A flange 28 is mounted on the portion 22 of the assembly that moves radially on the sprocket wheel 10. To the flanges 28 to which the collection of rods 24 and sleeves 26 are attached the rods 24 are mounted on the same side of the flanges 28, and the sleeves 26 are mounted on the opposite sides of the flanges 28. The collection of rods 24 and sleeves 26 forms a network of linkage that tends, except for play in the linkage, to equalize the radial distance that the spur gears have from the center of the sprocket wheel.

Figure 2:
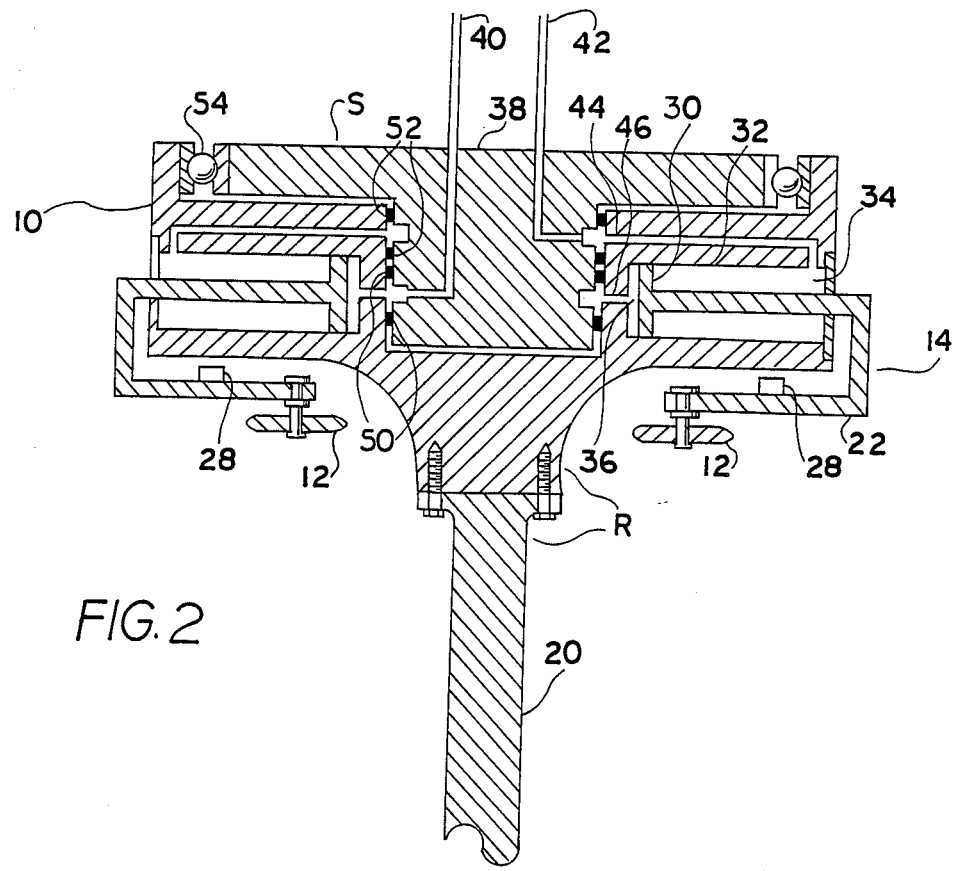
FIG. 2 is a sectional view showing the piston and cylinder assemblies for regulating the position of the sprocket, spur and/or friction gearing and thus the effective diameter.

In FIG. 2 it an be seen that the assemblies that have the radially moving portions 22 include piston 30 which may have telescopic rods (not shown) and cylinder 32 arrangements. The axes of the pistons 30 and cylinders 32 are radial and form components of the sprocket wheel 10 and the whole piston and rod assemblies include the moving portions 22 upon which the sprocket, spur and/or friction gears 12 are arbored. Conduits 44 and 46 leading to and from both ends 34 and 36 of the cylinders 32 form a part of the sprocket wheel. There is a hub 38 for including other conduits 40 and 42 which feed or are fed by the conduits 44 and 46 of the sprocket wheel. Conduits 40 and 42 are connected to a valve (not shown) which controls the direction of fluid flow to cylinders 32.

As the device is operated, hydraulic fluid under pressure is applied from a reversible pump, not shown, to conduit 40 which passes through the stationary portion of the device S to extend radially and cooperate with passage 46 within the rotary portion R of the mechanism. As rotary portion R is caused to rotate, the necessary tension to provide sufficient engaging or frictional force to chain or belt 16 will tend to cause sprocket, spur and/or friction gears 12 to pull arm 22 inward thereby causing piston and rod assemblies 14 to also move inward, reducing the volume within cylinder end 36. Sufficient hydraulic pressure applied through conduit 40 via conduits 46 extending radially to cylinder ends 36 may be used to push piston 30 and rod assemblies 14 outward, thereby expanding the diameter circumscribed by sprocket, spur and/or friction gears 12 as they rotate with rotating mechanism R. This controls the effective transmission gear ratio of the device. Conduits 42 and 44 would serve as hydraulic fluid return passages in this mode of operation.

Normally, the device will require hydraulic pressure to be applied as above in order to maintain a constant effective ratio for the reasons given above. However, hydraulic pressure may also be applied through conduit 42 of stationary hub S which communicates with conduit 44 to provide means of forcefully reducing the effective diameter of sprocket, spur and/or friction gears 12. Alternate conduits 40 and 46 would then serve as hydraulic fluid return passages.

In order to prevent hydraulic fluid from passing from cylinder end 36 to cylinder end 34 by way of conduits 46 and 44, or vice versa, seals 50 are installed circumferentially at each side of conduit 46. Therefore as hydraulic pressure is applied through conduit 40 to increase the effective diameter of the collection of gears 12, seals 50 will contain the pressure to allow the device to operate efficiently. In the event of the application of hydraulic pressure to conduit 42 to cause a reduction in effective diameter of the collection of gears 12, seals 52 will serve a like function of pressure containment. Bearings 54 are installed to allow stationary component S and rotary component R to operate smoothly and efficiently. Any number of bearings required to achieve this purpose may be incorporated.

As rotating portion R of the device turns, there will be a tendency of chain or belt 16 to apply pressure to sprocket, spur and/or friction gears 12 eccentrically. That is, gears 12 may have pressure forcing them and associated piston and rod assemblies 14 inward on one side of the device and allowing free movement of assemblies 14 on the opposite side. As the hydraulic system would be under constant pressure in order to force assemblies 14 outward against the pressure of chain or belt 16, this pressure would tend to cause assemblies 14 to move outward on the side of the mechanism on which they are not constrained by chain or belt 16. In order to keep all assemblies 14 and gears 12 equidistant from the center of wheel 10, a system of linked rods 24 and sleeves 26 or intermeshed gears 48 is used as described earlier.

The system of linked rods 24 and sleeves 26 are rigidly attached to arms 22 by means of flanges 28. As any one gear 12 and arm 22 is forced inward, it will also require the associated rod 24 and sleeve 26 to move inward. As rod 24 and sleeve 26 move inward, they will also draw the associated sleeve 26 and rod 24 rigidly attached to flanges 28 on the adjacent piston and rod assemblies 14 inward, thereby maintaining a constant effective diameter and gear ratio. As hydraulic pressure is added in this example, pistons 30 would be forced outward within cylinders 32 and would therefore require associated rods 24 and sleeves 26 to be drawn outward, thereby again causing the entire mechanism to establish a new effective diameter.

An alternative method of achieving the constant effective diameter required is disclosed in FIG. 4. By modifying arms 22 with teeth to intermesh with gears 48, each piston and rod assembly 14 and its associated gear 12 may be made to remain at an identical radius to that of all other assemblies 14 and gears 12, thereby producing the desired effective diameter and ratio achieved by the rod 24 and sleeve 26 linkages described above. Any practical number of gears 48 may be installed between each arm 22 to achieve the desired effect, so long as there are an even number of gears 48 between each arm 22 so as to cause arms 22, associated piston and rod assemblies 14, and gears 12 to move inward or outward collectively in unison.

It is to be understood that the present invention is not limited to the sole embodiment described above, but encompasses any and all embodiments within the scope of the following claims.

What is claimed is:

1. A sprocket wheel and control mechanism for a chain or belt drive transmission with a continuously adjustable mechanical advantage comprising:
   said sprocket wheel of said chain or belt drive transmission having variable effective diameters about a center including a plurality of pairs of diametrically opposed sprocket, spur and/or friction gears adapted for engagement with a chain or belt of said transmission;

hydraulic piston and cylinder assemblies activated by a flow of fluid, each of said assemblies controlling the variable effective diameters by displacement of each of said sprocket, spur and/or friction gears from the center of the sprocket wheel by control of said flow of said fluid to said assemblies and from said assemblies;

equalization means for tending to synchronously form uniform effective diameters by equalizing the displacement of said sprocket, spur and/or friction gears from the center of the sprocket wheel at any instant of time; and valve means for controlling said flow of said fluid to said assemblies and from said assemblies, said valve means having as one of a plurality of possible positions a neutral position for stabilizing said fluid in said piston and cylinder assemblies to stabilize the displacement of the sprocket, spur and/or friction gears and having, as the others of said positions, positions for moving said sprocket, spur and/or friction gears.

2. The transmission of claim 1 wherein:

said equalization means comprising linear linkage guides such as telescoping rods and sleeves, each rod connected to one piston and cylinder assembly and each sleeve telescoped on said each rod connected to an adjacent piston and cylinder assembly of said transmission mechanism.

3. The transmission of claim 1 wherein:

said equalization means comprising a series of intermeshing sprocket or spur gears, arranged circumferentially and engaging toothed arms, each arm acting as a carrier for said sprocket, spur and/or friction gears and moving radially in the manner of a standard rack and pinion arrangment.

4. The transmission of claim 1 wherein:

said valve means for controlling said flow of said fluid to said assemblies and from said assemblies.

* * * * *